United States Patent
Yamanobe et al.

(10) Patent No.: US 7,524,619 B2
(45) Date of Patent: Apr. 28, 2009

(54) COLORING MATTER ABSORBING NEAR-INFRARED RAY AND FILTER FOR CUTTING OFF NEAR-INFRARED RAY

(75) Inventors: Susumu Yamanobe, Gunma (JP); Masaaki Tamura, Gunma (JP); Yoji Yamaguchi, Gunma (JP); Hideo Yamamoto, Gunma (JP)

(73) Assignee: Japan Carlit Co., Ltd., Tokyo (JP)

( * ) Notice: Subject to any disclaimer, the term of this patent is extended or adjusted under 35 U.S.C. 154(b) by 490 days.

(21) Appl. No.: 10/535,671

(22) PCT Filed: Nov. 18, 2003

(86) PCT No.: PCT/JP03/14642

§ 371 (c)(1),
(2), (4) Date: May 19, 2005

(87) PCT Pub. No.: WO2004/048480

PCT Pub. Date: Jun. 10, 2004

(65) Prior Publication Data

US 2006/0073407 A1  Apr. 6, 2006

(30) Foreign Application Priority Data

Nov. 22, 2002  (JP) ............................. 2002-339110

(51) Int. Cl.
 *G03C 1/76* (2006.01)

(52) U.S. Cl. ................ 430/321; 570/127; 570/129; 556/6

(58) Field of Classification Search .................. 522/25, 522/29, 31; 430/270.1
See application file for complete search history.

(56) References Cited

U.S. PATENT DOCUMENTS

| 3,670,025 | A | * | 6/1972 | Susi et al. ................... 564/309 |
| 3,770,793 | A | * | 11/1973 | Sherr ......................... 558/261 |
| 4,429,093 | A | * | 1/1984 | Koshar ....................... 526/205 |
| 5,541,235 | A | * | 7/1996 | Busman et al. ............... 522/25 |
| 5,605,732 | A | * | 2/1997 | Mihara et al. ............. 428/64.8 |
| 6,120,696 | A | | 9/2000 | Armand et al. |
| 6,214,435 | B1 | * | 4/2001 | Onishi et al. ............... 428/64.4 |

FOREIGN PATENT DOCUMENTS

| JP | 10-180922 | | 7/1998 |
| JP | 2000-081511 | * | 3/2000 |
| JP | 2001-133624 | | 5/2001 |
| JP | 2001-264532 | * | 9/2001 |

OTHER PUBLICATIONS

Translation of JP-2001-264532(Sep. 2001).*

* cited by examiner

*Primary Examiner*—Martin J Angebranndt
*Assistant Examiner*—Anna L Verderame
(74) *Attorney, Agent, or Firm*—Oblon, Spivak, McClelland, Maier & Neustadt, P.C.

(57) ABSTRACT

A coloring matter absorbing a near-infrared ray which comprises a diimonium salt containing a sulfonimide as an anion moiety, represented by the general formula (1):

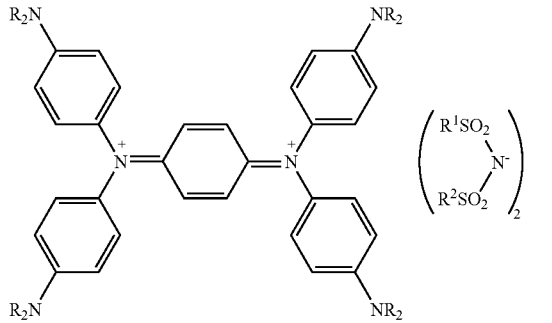 (1)

wherein R may be the same or different and represents a moiety selected from the group consisting of an alkyl group, a halogenated alkyl group, a cyanoalkyl group, an aryl group, a hydroxyl group, a phenyl group, and a phenylalkylene group, and $R^1$ and $R^2$ may be the same or different and each represent a fluoroalkyl group, or together form a fluoroalkylene group.

The coloring matter absorbing a near-infrared ray is excellent in the resistance to heat and moisture, and thus exhibits an ability of absorbing a near-infrared ray not lowering for a long period of time. A filter for cutting off a near-infrared ray manufactured by using the coloring matter can be advantageously used for wide applications such as a plasma display panel, an optical lens, a glass for an automobile, and a glass for a building material, due to its excellent resistance to heat and moisture.

28 Claims, 1 Drawing Sheet

COLORING MATTER ABSORBING NEAR-INFRARED RAY AND FILTER FOR CUTTING OFF NEAR-INFRARED RAY

TECHNICAL FIELD

The present invention relates to a novel near-infrared light absorbing dye obtained from a diimonium salt compound which absorbs light in the near-infrared spectrum and displays excellent resistance to heat and moisture and to a near-infrared light blocking filter containing the near-infrared light absorbing dye.

BACKGROUND ART

Recently, with the rise in demand for large and slim displays, plasma display panels (hereinafter abbreviated as "PDP") are becoming widely popular.

Since near-infrared light emitted from a PDP causes electronic equipment that use near-infrared remote controls to malfunction, a filter using a near-infrared light absorbing dye to block infrared rays is necessary.

Also, near-infrared light blocking filters are widely used in optical lenses, glass for automobiles and buildings, and the like.

In these applications, the near-infrared light blocking filter is required to effectively absorb light in the near-infrared spectrum, while allowing the transmission of visible light, and to possess high resistance to heat and moisture.

Various near-infrared light blocking filters comprising a diimmonium salt compound have been proposed (Japanese Patent Application Laid-open No. 10-180922).

This publication discloses various near-infrared light absorbing dyes of diimmonium salt. Of these, N,N,N',N'-tetrakis{p-di(n-butyl)aminophenyl}-p-phenylene diimmonium salt which comprises bis(hexafluoroantimonate) as the anion moiety is commonly used due to the relatively excellent resistance to heat and moisture.

However, resistance to heat and moisture of this near-infrared light absorbing dye is still inadequate. Specifically, the dye possesses some problems. For example the dye is decomposed during use thereby decreasing absorbance of near-infrared light. An aminium salt generated from decomposition of the dye causes visible light to be absorbed thereby decreasing transmissivity of visible light and resulting in yellow coloration which degrades color tone.

Furthermore, since this dye comprises a heavy metal as an anion moiety, use of a large quantity of this dye results in environmental pollution.

A first object of the present invention is to provide a novel near-infrared light absorbing dye with excellent resistance to heat and moisture, wherein near-infrared light absorbance does not decrease when used for a long period of time. A second object of the present invention is to provide a near-infrared light blocking filter possessing excellent resistance to heat and moisture.

DISCLOSURE OF THE INVENTION

As a result of extensive research, the present inventors discovered that a near-infrared light absorbing dye with excellent resistance to heat and moisture can be obtained from a diimonium salt comprising a specific anion moiety, thereby completing the present invention.

Particularly, the present invention provides a near-infrared light absorbing dye obtained from a diimonium salt comprising a sulfonimide represented by the following formula (1) as an anion moiety.

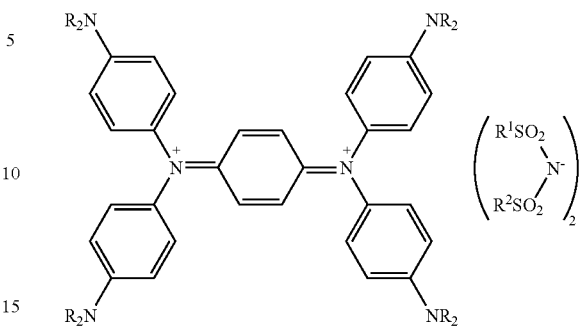

In the formula, R individually represents an alkyl group, alkyl halide, cyanoalkyl group, aryl group, hydroxyl group, phenyl group, or phenylalkylene group, and $R^1$ and $R^2$ individually represent a fluoroalkyl group or combine to form a fluoroalkylene group.

In the above near-infrared light absorbing dye, $R^1$ and $R^2$ in the formula (1) preferably individually represent a perfluoroalkyl group having 1-8 carbon atoms.

In the above near-infrared light absorbing dye, the fluoroalkylene group formed from the combination of $R^1$ and $R^2$ in the formula (1) is preferably a perfluoroalkylene group having 2-12 carbon atoms.

The present invention further provides a near-infrared light blocking filter comprising the above near-infrared light absorbing dye.

BEST MODE FOR CARRYING OUT THE INVENTION

Figure 1:
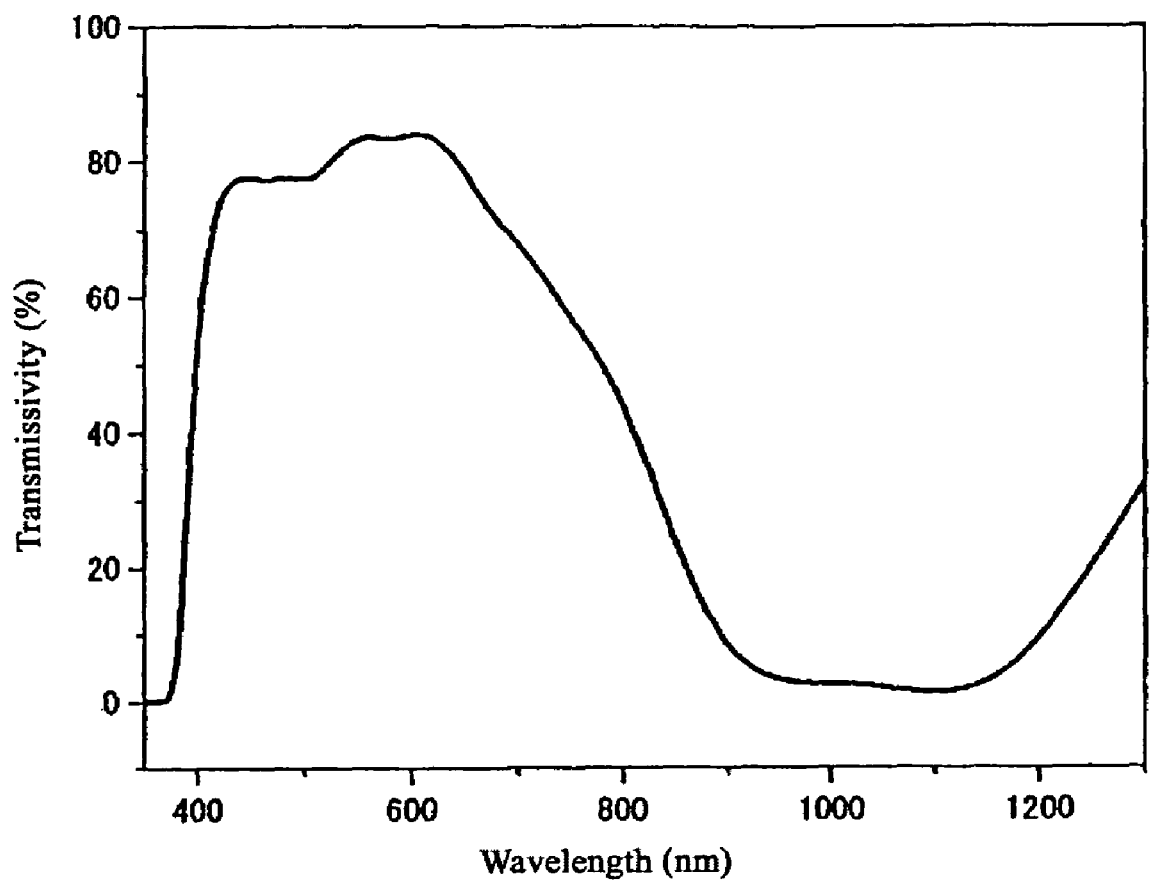
FIG. 1 shows the transmissivity spectrum of the near-infrared light blocking filter obtained in Example 1.

The near-infrared light absorbing dye of the present invention is obtained from a diimonium salt comprising a sulfonimide represented by the above formula (1) as an anion moiety. The near-infrared light referred to in the present invention is light with a wavelength in the range of 760-2,000 nm.

There are no limitations to the number of fluorine atoms or carbon atoms substituted inasmuch as $R^1$ and $R^2$ in the anion moiety shown by the formula (1) individually represent a fluoroalkyl group or combine to form a fluoroalkylene group. $R^1$ and $R^2$ preferably individually represent a perfluoroalkyl group having 1-8 carbon atoms. As a preferable example of the anion moiety, an anion moiety represented by the following formula (3) can be given.

In the formula, n and n' represent an integer from 1 to 8.

n and n' preferably represent an integer from 1 to 4. As preferable specific examples, perfluoroalkanesulfonyl groups in which n and n' are the same such as bis(trifluoromethanesulfone)imide and bis(pentafluoroethanesulfone)imide; and perfluoroalkanesulfonyl groups in which n and n' are different such as pentafluoroethanesulfone trifluoromethanesulfonimide, trifluoromethanesulfone heptafluoropropanesulfonimide, and nonafluorobutanesulfone trifluoromethanesulfonimide can be given. Of these, perfluoroalkanesulfonyl groups in which n and n' are the same, wherein each of n and n' is either 1 or 2, such as bis(trifluoromethanesulfone)imide or bis(pentafluoroethanesulfone)imide are particularly preferable in view of near-infrared light absorbance.

Furthermore, a perfluoroalkylene group having 2-12 carbon atoms formed by the combination of $R_1$ and $R_2$ can be given as another preferable example of $R_1$ and $R_2$ in the anion moiety shown by the formula (1). As a preferable example of the anion moiety, an anion moiety represented by the following formula (4) can be given.

(4)

In the formula, m is an integer of 2-12.

An anion moiety wherein m is preferably an integer of 2-8 and particularly preferably an integer of 3, such as 1,3-disulfonylhexafluoropropyleneimide shown by the following formula (5) can be given.

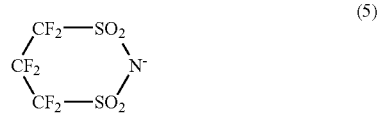

(5)

The perfluoroalkylene group having 2-12 carbon atoms is preferable due to increased heat resistance.

In formula (1), R individually represents a substituent selected from the group comprising an alkyl group, alkyl halide, cyanoalkyl group, aryl group, hydroxyl group, phenyl group, and phenylalkylene group.

There are no restrictions to the R as long as it is one of the above substituents. R is preferably a linear or branched alkyl group, alkyl halide, cyanoalkyl group or the like having 1-8 carbon atoms, with a linear alkyl group having 2-6 carbon atoms being particularly preferable.

As particularly preferable specific examples of R in the formula (1), an ethyl group, propyl group, butyl group, amyl group, isopropyl group, isobutyl group, isoamyl group, and the like can be given.

Also, as another preferable example of R, a phenylalkylene group represented by the following formula (2) can be given.

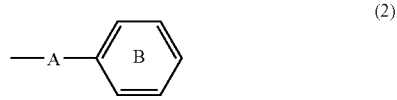

(2)

In the formula, A represents a linear or branched alkylene group having 1-18 carbon atoms and B represents a substituted or unsubstituted benzene ring.

In the phenylalkylene group of the formula (2), the alkylene group particularly preferably has 1-8 carbon atoms.

Furthermore, the substituted or unsubstituted phenyl group of the phenylalkylene represented by the formula (2) may be substituted by at least one substituent selected from the group consisting of an alkyl group, hydroxyl group, sulfonic acid group, alkyl sulfonic acid group, nitro group, amino group, alkoxy group, alkyl halide, and halogen. An unsubstituted phenyl group is preferable.

As specific examples of the phenylalkylene group, a benzyl group, phenethyl group, phenylpropylene group, phenyl-α-methylpropylene group, phenyl-β-methylpropylene group, phenylbutylene group, phenylpentylene group, phenyloctylene group, and the like can be given.

The phenylalkylene group shown by the above formula (2) is used to improve heat resistance, however, the use of a benzyl group or phenethyl group is even more preferable.

Next, a method for preparing the near-infrared light absorbing dye of the present invention will be described.

A silver sulfonimide acid derivative of the following formula (6) and a compound of the following formula (7) are reacted in an organic solvent such as N-methyl-2-pyrrolidone, dimethylformamide (hereinafter abbreviated as "DMF"), or acetonitrile at 30-150° C. After separating the precipitated silver by filtration and adding a solvent such as water, ethyl acetate, or hexane, the resulting precipitate is filtered to obtain the near-infrared light absorbing dye of the present invention.

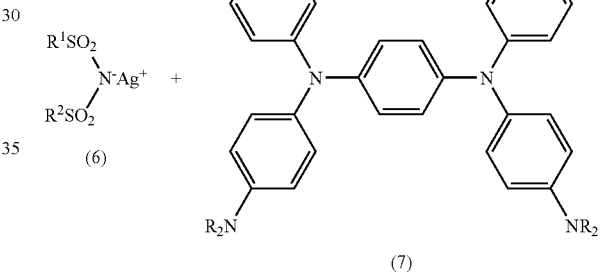

In the formula, R, $R_1$, and $R_2$ are the same as defined above.

The dye obtained in this manner is combined with a suitable polymer resin and formed into the shape of a film or panel using a known method such as casting or melt extrusion to obtain the near-infrared light blocking filter of the present invention.

In order to manufacture the near-infrared light blocking filter of the present invention by a casting method, the near-infrared light absorbing dye of the present invention is dissolved or dispersed in a solution in which a polymer resin and a solvent are dissolved and the resulting solution is applied to a transparent film of polyester, polycarbonate, or the like, a panel, or glass and dried to obtain a film.

Any known transparent resin may be used as the above polymer resin, with resins such as acrylic resin, polyester resin, polycarbonate, urethane resin, cellulose resin, polyisocyanate, polyallylate, and epoxy resin being preferable.

Also, even though there are no restrictions to the above solvent, an organic solvent such as methyl ethyl ketone, methyl isobutyl ketone, toluene, xylene, tetrahydrofuran, and 1,4-dioxane, or a mixture of these solvents may be used.

On the other hand, when a melt extrusion method is used to manufacture the near-infrared light blocking filter of the present invention, the near-infrared light absorbing dye of the present invention is melted and mixed in the polymer resin and extruded in the shape of a panel.

Any known transparent resin may be used as the above polymer resin, with resins such as acrylic resin, polyester resin, and polycarbonate being preferable.

In manufacturing the near-infrared light blocking filter of the present invention, the near-infrared light absorbing dye may be used alone or, in order to improve the blocking performance of near-infrared lights near a wavelength of 850 nm, may be used in combination with a known dye such as a phthalocyanine or a dithiol metal complex. Also, in order to improve lightfastness, ultraviolet absorption dyes such as benzophenone and benzotriazole may be added. Furthermore, when necessary, a conventional dye that absorbs visible light may be added in order to adjust the color tone.

The near-infrared light transmissivity of the near-infrared light blocking filter of the present invention can be controlled by adjusting the mixed ratio of the near-infrared light absorbing dye of the present invention and the polymer resin. Although not specifically limited, the near-infrared light absorbing dye is preferably used in an amount in the range of 0.01-30 wt % (hereinafter abbreviated as "%") for the total amount of the polymer resin. If the near-infrared light absorbing dye is used in an amount less than 0.01%, the near-infrared light blocking capability is unsatisfactory, and if more than 30%, transmissivity of visible light declines. The near-infrared light absorbing dye is particularly preferably used in an amount of 0.05-30% for the total amount of the polymer resin.

The near-infrared light absorbing dye of the present invention as described above excels in resistance to heat and moisture, does not lose near-infrared light absorbance over a long period of time, and, due to the absence of heavy metals, does not adversely affect the environment.

Furthermore, the near-infrared light blocking filter comprising the near-infrared light absorbing dye of the present invention can be used in a wide variety of uses that require blocking of near-infrared light. As specific examples, the near-infrared light blocking filter can be used in PDP's and glass for automobiles and buildings, and suitably used in PDP's.

Furthermore, the near-infrared light absorbing dye of the present invention may also be used as a dye or quencher for optical recording media such as a CD-R or DVD-R.

EXAMPLES

The present invention will be described in more detail by way of Examples which should not be construed as limiting the present invention. In the examples, "wt %" is indicated as "%" and "parts by weight" is indicated as "parts".

Example 1

(1) 10 parts of silver bis(trifluoromethanesulfone)imidate and 11.8 parts of N,N,N',N'-tetrakis(p-dibutylaminophenyl)-p-phenylene diamine were added to 100 parts of DMF, the mixture was reacted at 60° C. for three hours, and the silver produced from the reaction was separated by filtration.

Next, 200 parts of water was added to the filtrate and the precipitate was separated by filtration and dried to obtain 15.7 parts of bis(trifluoromethanesulfone)imidate N,N,N',N'-tetrakis(p-dibutylaminophenyl)-p-phenylene diimmonium as a near-infrared light absorbing dye. This near-infrared light absorbing dye had a maximum absorption wavelength (hereinafter abbreviated as "λmax") of 1,074 nm and a molar absorption coefficient of 105,000 [L.mol$^{-1}$.cm$^{-1}$]. Differential thermal analysis confirmed that the near-infrared light absorbing dye had a melting point of 191° C. and a decomposition point of 310° C.

(2) Next, 2 parts of the near-infrared light absorbing dye was dissolved in a solution containing 6 parts of an acrylic lacquer resin (Thermolac LP-45M, registered trademark of Soken Chemical & Engineering Co., Ltd.), 25 parts of methylethyl ketone, and 13 parts of toluene. This solution was applied to a commercially available polymethacrylic resin film (thickness: 50 μm) using a 200 μm bar coater. The solution was dried at 100° C. for three minutes to obtain the near-infrared light blocking filter of the present invention.

(3) The heat resistance of the filter maintained in an atmosphere at 80° C. was examined and the percentage of the molar absorption coefficient after a predetermined period of time was calculated using the initial molar absorption coefficient at a wavelength of 1,000 nm as 100% to determine the residual ratio of the near-infrared light absorbing dye.

Next, transmissivity at a wavelength of 480 nm was measured after maintaining the filter in an atmosphere at 80° C. for a predetermined period of time. The results are shown in Table 1.

The moisture resistance of the filter maintained in an atmosphere of 60° C. and 95% RH was examined and the residual ratio and transmissivity of the near-infrared light absorbing dye at a wavelength of 480 nm was determined in the same manner as in the heat resistance examination. The results are shown in Table 2.

Example 2

Bis(trifluoromethanesulfone)imidate N,N,N',N'-tetrakis (p-dibutylaminophenyl)-p-phenylenediimmonium was obtained in the same manner as in Example 1 except for using 12.6 parts of silver bis(pentafluoroethanesulfone)imidate instead of 10 parts of silver bis(trifluoromethanesulfone)imidate. This near-infrared light absorbing dye had a λmax of 1,074 nm and a molar absorption coefficient of 101,000 [L.mol$^{-1}$.cm$^{-1}$], a melting point of 185° C., and a decomposition point of 301° C.

A near-infrared light blocking filter was manufactured and the heat and moisture resistance of the filter was examined in the same manner as in Example 1. The results are shown in Tables 1 and 2.

Comparative Example

Bis(hexafluoroantimonate) N,N,N',N'-tetrakis {p-di(n-butyl)aminophenyl}-p-phenylene diimmonium was obtained in the same manner as in Example 1 except for using 8.9 parts of silver hexafluoroantimonate instead of 10 parts of silver bis (trifluoromethanesulfone)imidate. This near-infrared light absorbing dye had a λmax of 1,074 nm and a molar absorption coefficient of 101,000 [L.mol$^{-1}$.cm$^{-1}$], a melting point of 185° C., and a decomposition point of 301° C.

A near-infrared light blocking filter was manufactured and the heat and moisture resistance of the filter was examined in the same manner as in Example 1. The results are shown in Tables 1 and 2.

TABLE 1

Heat Resistance

| | Dye residual ratio (%) | | | 480 nm transmissivity rate (%) | | |
|---|---|---|---|---|---|---|
| Period of time | Example 1 | Example 2 | Comparative Example | Example 1 | Example 2 | Comparative Example |
| Initial | 100 | 100 | 100 | 77.6 | 78.1 | 76.1 |
| After 120 hours | 96.5 | 95.8 | 89.7 | 77.2 | 77.5 | 75.6 |
| After 240 hours | 94.4 | 93.1 | 85.6 | 77.3 | 76.1 | 72.8 |
| After 500 hours | 92.7 | 91.8 | 81.2 | 76.7 | 75.8 | 71.4 |

TABLE 2

Moisture Resistance

| | Dye residual ratio (%) | | | 480 nm transmissivity rate (%) | | |
|---|---|---|---|---|---|---|
| Period of time | Example 1 | Example 2 | Comparative Example | Example 1 | Example 2 | Comparative Example |
| Initial | 100 | 100 | 100 | 76.7 | 76.1 | 76.7 |
| After 120 hours | 95.9 | 94.8 | 88.9 | 75.0 | 74.0 | 70.3 |
| After 240 hours | 94.4 | 92.9 | 84.8 | 74.5 | 72.9 | 68.4 |
| After 500 hours | 91.2 | 89.8 | 80.0 | 73.5 | 70.8 | 65.4 |

The results show that the conventional near-infrared light absorbing dye of the comparative example possesses low resistance to heat and moisture, decomposes over time, and has a low absorbance index of near-infrared light near a wavelength of 1,000 nm. Furthermore, an aminium salt compound and the like generated from decomposition absorbs visible light near a wavelength of 480 nm thereby causing transmissivity of visible light to degrade and results in yellow coloration which degrades color tone.

In comparison, the near-infrared light blocking filters comprising the near-infrared light absorbing dyes obtained in Examples 1 and 2 possess excellent resistance to heat and moisture, only slightly degraded near-infrared light absorption performance, and coloration due to decomposition of the dye only with difficulty.

Example 3

10 parts of N,N,N',N'-tetrakis(p-aminophenyl)-p-phenylenediamine, 55 parts of iodated benzyl as a substituent raw material, and 30 parts of potassium carbonate were added to 100 parts of DMF solvent and the mixture was reacted at 120° C. for ten hours while stirring.

Next, 500 parts of water was added to the reaction solution and the precipitate was separated by filtration, washed with water, and dried at 100° C. to obtain 23.1 parts of N,N,N',N'-tetrakis(p-dibenzylaminophenyl)-p-phenylenediamine.

23.1 parts of the above reaction product and 32.5 parts of silver bis(trifluoromethanesulfone)imide as an anion raw material were added to 200 parts of DMF solvent, the solution was reacted at 60° C. for three hours with stirring, and the produced silver was separated by filtration.

Next, 200 parts of water was added to the obtained filtrate and the precipitate was separated by filtration, washed with water, and dried at 100° C. to obtain 32.2 parts of the near-infrared light absorbing dye of the present invention. The dye obtained was bis{bis(trifluoromethanesulfone)imidate}N,N, N',N'-tetrakis(p-dibenzylaminophenyl)-p-phenylenediimmonium shown by the formula (1) wherein all R substituents are benzyl groups.

Example 4

The dye of the present invention, bis{bis(trifluoromethanesulfone)imidate}N,N,N',N'-tetrakis(p-diphenethylaminophenyl)-p-phenylenediimmonium, was obtained in the same manner as in Example 3 except for using 58.5 parts of iodated phenethyl as a substituent raw material.

Example 5

The dye of the present invention, bis{bis(trifluoromethanesulfone)imidate}N,N,N',N'-tetrakis {p-di(4-fluorinated)benzylaminophenyl}-p-phenylenediimmonium, was obtained in the same manner as in Example 3 except for using 59.5 parts of iodated (4-fluorinated)benzyl as a substituent raw material.

Example 6

First, 3.5 parts of 1,3-disulfonhexafluoropropyleneimidate (manufactured by JEMCO Inc.) was dissolved in 20 parts of water, 1.4 part of silver oxide (I) was added, and the mixture was reacted and concentrated by drying to obtain 4.8 parts of silver 1,3-disulfonylhexafluoropropyleneimidate.

The near-infrared light absorbing dye of the present invention, bis(1,3-disulfonylhexafluoropropyleneimidate)N,N,N', N'-tetrakis(p-diphenethylaminophenyl)-p-phenylenediimmonium, was obtained in the same manner as in Example 3 except for using 58.5 parts of iodated phenethyl as a substituent raw material and 33.5 parts of silver 1,3-disulfonylhexafluoropropyleneimidate as an anion raw material.

Example 7

The near-infrared light absorbing dye of the present invention, bis(1,3-disulfonylhexafluoropropyleneimidate)N,N,N', N'-tetrakis(p-dibutylaminophenyl)-p-phenylenediimmonium, was obtained in the same manner as in Example 3 except for using 46.4 parts of iodated butyl as a substituent raw material and 33.5 parts of silver 1,3-disulfonylhexafluoropropyleneimidate as an anion raw material.

Example 8

The λmax and molar absorption coefficient of the near-infrared light absorbing dyes obtained in Examples 3-7 were measured. The results are shown in Table 3. (The unit of molar absorptivity shown in Table 3 is [L.mol$^{-1}$.cm$^{-1}$].)

A near-infrared light blocking filter was manufactured and the heat and moisture resistance of the filter was examined in the same manner as in Example 1. The results are shown in Tables 4 and 5.

TABLE 3

| | Property Value | | |
|---|---|---|---|
| Example | Near-infrared light absorbing dye | λmax (nm) | Molar absorption coefficient |
| 3 | Bis{bis(trifluoromethanesulfone)imidate}-N,N,N',N'-tetrakis(p-dibenzylaminophenyl)-p-phenylenediimmonium | 1059 | 104000 |
| 4 | Bis{bis(trifluoromethanesulfone)imidate}-N,N,N',N'-tetrakis(p-diphenetylaminophenyl)-p-phenylenediimmonium | 1074 | 104000 |
| 5 | Bis{bis(trifluoromethanesulfone)imidate}-N,N,N',N'-tetrakis{p-di(4-fluorinated)benzylaminophenyl}-p-phenylenediimmonium | 1051 | 103000 |
| 6 | Bis(1,3-disulfonylhexafluoropropyleneimidate)-N,N,N',N'-tetrakis(p-diphenethylaminophenyl)-p-phenylenediimmonium | 1073 | 104000 |
| 7 | Bis(1,3-disulfonylhexafluoropropyleneimidate)-N,N,N',N'-tetrakis(p-dibutylaminophenyl)-p-phenylenediimmonium | 1073 | 104000 |

As shown in Tables 4 and 5, the near-infrared light blocking filters comprising the near-infrared light absorbing dyes obtained in Examples 3-7 possess excellent resistance to heat and moisture, only slightly degraded near-infrared light absorption performance, and coloration due to decomposition of the dye only with difficulty.

INDUSTRIAL APPLICABILITY

The near-infrared light absorbing dye of the present invention excels in resistance to heat and moisture, does not lose near-infrared light absorbance over a long period of time, and, due to the absence of heavy metals, does not adversely affect the environment.

The near-infrared light blocking filter comprising the near-infrared light absorbing dye of the present invention can be used in a wide variety of uses including PDP's and glass for automobiles and buildings, in particular PDP's.

Furthermore, the near-infrared light absorbing dye of the present invention may also be used as a dye or quencher for conventional optical recording media such as a CD-R or DVD-R.

The invention claimed is:

1. A near-infrared light absorbing dye obtained from a diimonium salt comprising a sulfonimide represented by the formula (1):

TABLE 4

| | Heat Resistance | | | | | | | | | |
|---|---|---|---|---|---|---|---|---|---|---|
| | Dye residual ratio (%) | | | | | 480 nm transmissivity rate (%) | | | | |
| | Example | | | | | Example | | | | |
| Period of time | 3 | 4 | 5 | 6 | 7 | 3 | 4 | 5 | 6 | 7 |
| Initial | 100 | 100 | 100 | 100 | 100 | 77.2 | 77.9 | 77.2 | 77.9 | 77.3 |
| After 120 hours | 98.7 | 99.2 | 98.7 | 99.1 | 98.8 | 76.8 | 77.4 | 76.9 | 77.5 | 76.8 |
| After 240 hours | 97.2 | 98.0 | 97.4 | 98.2 | 97.7 | 75.8 | 76.6 | 76.0 | 76.7 | 75.7 |
| After 500 hours | 94.8 | 96.0 | 95.2 | 96.3 | 94.5 | 75.3 | 76.2 | 75.5 | 76.3 | 75.2 |

TABLE 5

| | Moisture Resistance | | | | | | | | | |
|---|---|---|---|---|---|---|---|---|---|---|
| | Dye residual ratio (%) | | | | | 480 nm transmissivity rate (%) | | | | |
| | Example | | | | | Example | | | | |
| Period of time | 3 | 4 | 5 | 6 | 7 | 3 | 4 | 5 | 6 | 7 |
| Initial | 100 | 100 | 100 | 100 | 100 | 77.1 | 77.9 | 77.2 | 77.9 | 77.3 |
| After 120 hours | 98.6 | 99.0 | 98.5 | 98.7 | 98.4 | 76.1 | 77.4 | 76.5 | 77.4 | 76.3 |
| After 240 hours | 96.6 | 97.4 | 96.5 | 97.5 | 96.5 | 74.0 | 76.2 | 74.8 | 76.5 | 74.1 |
| After 500 hours | 92.9 | 94.8 | 93.3 | 95.1 | 92.6 | 73.1 | 75.8 | 73.8 | 75.9 | 72.9 |

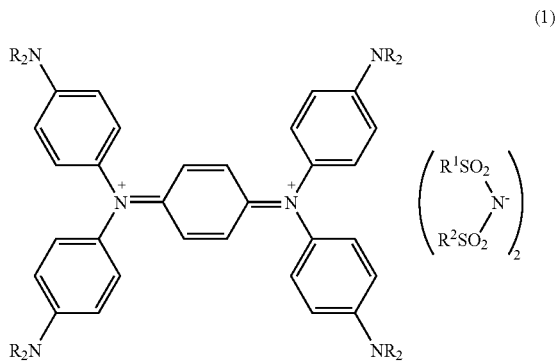

wherein, R individually represents an alkyl group, alkyl halide, aryl group, hydroxyl group, phenyl group, or phenylalkylene group, and $R^1$ and $R^2$ individually represent a fluoroalkyl group or combine to form a fluoroalkylene group.

2. The near-infrared light absorbing dye of claim 1, wherein $R^1$ and $R^2$ individually represent a perfluoroalkyl group having 1-8 carbon atoms.

3. The near-infrared light absorbing dye of claim 2, wherein $R^1$ and $R^2$ both represent a trifluoromethyl group or both represent a pentafluoroethyl group.

4. The near-infrared light absorbing dye of claim 1, wherein $R^1$ and $R^2$ combine to form a perfluoroalkylene group having 2-12 carbon atoms.

5. The near-infrared light absorbing dye of claim 4, wherein $R^1$ and $R^2$ combine to form a hexafluoropropylene group.

6. The near-infrared light absorbing dye of claim 1, wherein R represents a linear or branched alkyl group having 1-8 carbon atoms or an alkyl halide.

7. The near-infrared light absorbing dye of claim 2, wherein R represents a linear or branched alkyl group having 1-8 carbon atoms or an alkyl halide.

8. The near-infrared light absorbing dye of claim 3, wherein R represents a linear or branched alkyl group having 1-8 carbon atoms or an alkyl halide.

9. The near-infrared light absorbing dye of claim 4, wherein R represents a linear or branched alkyl group having 1-8 carbon atoms or an alkyl halide.

10. The near-infrared light absorbing dye of claim 5, wherein R represents a linear or branched alkyl group having 1-8 carbon atoms or an alkyl halide.

11. The near-infrared light absorbing dye of claim 1, wherein R represents a phenylalkylene group of the following formula:

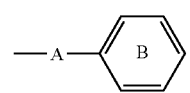

wherein, A represents a linear or branched alkylene group having 1-18 carbon atoms and B represents a substituted or unsubstituted benzene ring.

12. The near-infrared light absorbing dye of claim 2, wherein R represents a phenylalkylene group of the following formula:

wherein, A represents a linear or branched alkylene group having 1-18 carbon atoms and B represents a substituted or unsubstituted benzene ring.

13. The near-infrared light absorbing dye of claim 11, wherein R represents a benzyl group or phenethyl group.

14. The near-infrared light absorbing dye of claim 12, wherein R represents a benzyl group or phenethyl group.

15. A near-infrared light blocking Filter comprising the Near-infrared light absorbing dye of claim 1.

16. A near-infrared light blocking filter comprising the near-infrared light absorbing dye of claim 2.

17. A near-infrared light blocking Filter comprising the near-infrared light absorbing dye of claim 3.

18. A near-infrared light blocking Filter comprising the near-infrared light absorbing dye of claim 4.

19. A near-infrared light blocking filter comprising the near-infrared light absorbing dye of claim 5.

20. A near-infrared light blocking Filter comprising the near-infrared light absorbing dye of claim 6.

21. A near-infrared light blocking Filter comprising the near-infrared light absorbing dye of claim 7.

22. A near-infrared light blocking Filter comprising the near-infrared light absorbing dye of claim 8.

23. A near-infrared light blocking filter comprising the near-infrared light absorbing dye of claim 9.

24. A near-infrared light blocking filter comprising the near-infrared light absorbing dye of claim 10.

25. A near-infrared light blocking filter comprising the near-infrared light absorbing dye of claim 11.

26. A near-infrared light blocking filter comprising the near-infrared light absorbing dye of claim 12.

27. A near-infrared light blocking filter comprising the near-infrared light absorbing dye of claim 13.

28. A near-infrared light blocking filter comprising the near-infrared light absorbing dye of claim 14.

* * * * *